United States Patent
Bikumala et al.

(10) Patent No.: US 12,393,866 B2
(45) Date of Patent: Aug. 19, 2025

(54) SYSTEM AND METHOD FOR IDENTIFICATION OF REPLACEMENT PARTS USING ARTIFICIAL INTELLIGENCE/MACHINE LEARNING

(71) Applicant: Dell Products L.P., Round Rock, TX (US)

(72) Inventors: Sathish Kumar Bikumala, Round Rock, TX (US); Parminder Singh Sethi, Punjab (IN); Deepak NagarajeGowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 1090 days.

(21) Appl. No.: 17/243,684

(22) Filed: Apr. 29, 2021

(65) Prior Publication Data
US 2022/0351066 A1    Nov. 3, 2022

(51) Int. Cl.
*G06N 20/00* (2019.01)
*G06F 16/21* (2019.01)
(Continued)

(52) U.S. Cl.
CPC ........... *G06N 20/00* (2019.01); *G06F 16/211* (2019.01); *G06F 16/285* (2019.01); *G06N 5/04* (2013.01);
(Continued)

(58) Field of Classification Search
CPC .......... G06N 20/00; G06N 5/04; G06Q 40/12; G06Q 10/0875; G06Q 10/20;
(Continued)

(56) References Cited

U.S. PATENT DOCUMENTS 6,486,439 B1 * 11/2002 Spear ...................... H04L 67/02
                                                    219/136
10,013,510 B1 *  7/2018 Kanthasamy ........... G06F 30/17
(Continued)

FOREIGN PATENT DOCUMENTS

CN         112651411 A  *  4/2021   ....... G06F 18/23213

OTHER PUBLICATIONS

Title: IoT-Based Prognostics and Systems Health Management for Industrial Applications Authors: Daeil Kwon1, (Member, IEEE), Melinda R. Hodkiewicz2, (Member, IEEE), Jiajie Fan3, (Member, IEEE), Tadahiro Sgibutani4, and Michael G. Pecht5, (Fellow, IEEE) (Year: 2016).*

(Continued)

*Primary Examiner* — Andrew T McIntosh
(74) *Attorney, Agent, or Firm* — Terrile, Cannatti & Chambers, LLP; Stephen A. Terrile

(57) ABSTRACT

Systems, methods, and computer-readable media to identify replacement parts for an electronic asset using artificial intelligence/machine learning (AI/ML). In at least one embodiment, part data may be provided to an input of a trained AI/ML parts similarity model that has been trained to determine similarities between parts, including the parts used in a plurality of electronic assets of the organization. The trained AI/ML parts similarity model uses the part data to provide information relating to parts that are compatible with the part. In certain embodiments, the information relating to compatible parts includes an identifier for compatible parts and a similarity score indicating how similar each compatible part is to the part that is to be used to service the electronic asset.

14 Claims, 11 Drawing Sheets

(51) Int. Cl.
*G06F 16/28* (2019.01)
*G06N 5/04* (2023.01)
*G06Q 10/0875* (2023.01)
*G06Q 10/20* (2023.01)
*G06Q 30/0601* (2023.01)
*G06Q 40/12* (2023.01)

(52) U.S. Cl.
CPC ......... *G06Q 10/0875* (2013.01); *G06Q 10/20* (2013.01); *G06Q 30/0633* (2013.01); *G06Q 40/12* (2013.12); *G06Q 30/0603* (2013.01)

(58) Field of Classification Search
CPC ............ G06Q 30/0633; G06Q 30/0603; G06F 16/285; G06F 16/211
See application file for complete search history.

(56) References Cited

U.S. PATENT DOCUMENTS

| | | | | |
|---|---|---|---|---|
| 10,824,145 | B1* | 11/2020 | Konrardy | B60L 53/36 |
| 10,949,814 | B1* | 3/2021 | Nelson | G06Q 10/20 |
| 11,288,789 | B1* | 3/2022 | Chen | G06T 7/001 |
| 11,844,134 | B1* | 12/2023 | Agarwal | H04B 17/373 |
| 11,861,953 | B1* | 1/2024 | Hayes | G07C 5/008 |
| 2002/0156692 | A1* | 10/2002 | Squeglia | G06Q 10/087 |
| | | | | 705/26.81 |
| 2008/0059120 | A1* | 3/2008 | Xiao | G06F 11/0748 |
| | | | | 702/187 |
| 2015/0095196 | A1* | 4/2015 | Burks | G06Q 30/0627 |
| | | | | 705/26.63 |
| 2016/0284116 | A1* | 9/2016 | Crain | H04N 23/51 |
| 2018/0260793 | A1* | 9/2018 | Li | G06Q 40/08 |
| 2019/0056107 | A1* | 2/2019 | Desai | F23N 1/002 |
| 2020/0104793 | A1* | 4/2020 | Wang | G06Q 10/0875 |
| 2020/0134496 | A1* | 4/2020 | Lugo Beauchamp | G06N 7/00 |
| 2020/0211699 | A1* | 7/2020 | Nuthi | G16H 40/40 |
| 2020/0379454 | A1* | 12/2020 | Trinh | G05B 23/024 |
| 2021/0004284 | A1* | 1/2021 | Vah | G06N 20/20 |
| 2022/0036214 | A1* | 2/2022 | Venugopal | G06N 20/00 |
| 2022/0055635 | A1* | 2/2022 | Yokoyama | B60W 50/06 |

OTHER PUBLICATIONS

Carvalho, Thyago P., et al. "A systemic literature review of machine learning methods applied to predictive maintenance." Computers & Industrial Engineering 137 (2019): 106024 (Year: 2019).*

Abdi, Abdollah, and Sharareh Taghipour. "Sustainable asset management: A repair-replacement decision model considering environmental impacts, maintenance quality, and risk." Computers & Industrial Engineering 136 (2019): 117-137 (Year: 2019).*

* cited by examiner

SYSTEM AND METHOD FOR IDENTIFICATION OF REPLACEMENT PARTS USING ARTIFICIAL INTELLIGENCE/MACHINE LEARNING

BACKGROUND OF THE INVENTION

Field of the Invention

The present invention relates to information handling systems. More specifically, embodiments of the invention relate to a system and method for the identification of replacement parts using artificial intelligence/machine learning.

Description of the Related Art

As the value and use of information continue to increase, individuals and businesses seek additional ways to process and store information. One option available to users is an information handling system (IHS). An IHS generally processes, compiles, stores, and/or communicates information or data for business, personal, or other purposes, thereby allowing users to take advantage of the value of the information. Because technology and information handling needs and requirements vary between different users or applications, IHS may also vary regarding what information is handled, how the information is handled, how much information is processed, stored, or communicated, and how quickly and efficiently the information may be processed, stored, or communicated. IHS variations allow for information handling systems to be general or configured for a specific user or specific use, such as financial transaction processing, airline reservations, enterprise data storage, or global communications. Also, information handling systems may include various hardware and software components that may be configured to process, store, and communicate information and may include one or more computer systems, data storage systems, and networking systems.

Organizations, such as large enterprises, often employ a wide range of IHSs for various purposes. Such IHSs often fail and must be repaired. Emergency repair of critical IHSs may require immediate replacement of failed parts, which may be difficult to obtain in a timely manner.

SUMMARY OF THE INVENTION

A system of one or more computers can be configured to perform particular operations or actions by virtue of having software, firmware, hardware, or a combination of them installed on the system that in operation causes or cause the system to identify replacement parts for an electronic asset using artificial intelligence/machine learning (AI/ML). One general aspect includes a computer-implemented method that includes obtaining part data for a part that is to be used to service an electronic asset of an organization. The part data may be provided to an input of a trained AI/ML parts similarity model that has been trained to determine similarities between parts, including the parts used in a plurality of electronic assets of the organization. In at least one embodiment, the trained AI/ML parts similarity model is trained using processed feature data extracted from a plurality of data sources having data relating to part numbers and corresponding part specifications for a plurality of parts, including parts used in the plurality of electronic assets. In at least one embodiment, the trained AI/ML parts similarity model uses the part data to provide information relating to parts that are compatible with the part. In certain embodiments, the information relating to compatible parts includes an identifier for compatible parts and a similarity score indicating how similar each compatible part is to the part that is to be used to service the electronic asset. The method also includes providing the information relating to compatible parts to a user to facilitate service of the electronic asset. Other embodiments of this aspect include corresponding computer systems, apparatus, and computer programs recorded on one or more computer storage devices, each configured to perform the actions of the methods.

In various embodiments, the trained AI/ML parts similarity model further provides information relating to the availability of one or more of the compatible parts. In at least one embodiment, the trained AI/ML parts similarity model is further configured to identify alternative parts that are compatible with the part, where the alternative parts include parts not currently used in any of the plurality of electronic assets of the organization.

In at least one embodiment, the plurality of data sources include one or more of: telemetry data for parts used in the plurality of electronic assets; purchase orders for parts used in the plurality of electronic assets; invoices for parts used in the plurality of electronic assets; inventory data for parts used in the plurality of electronic assets; service records relating to the plurality of electronic assets; service records for parts used in the plurality of electronic assets; and a parts catalog for parts used in the plurality of electronic assets.

In at least one embodiment, training of the trained AI/ML parts similarity model may include: extracting and selecting feature data from the plurality of data sources; executing an unsupervised AI/ML categorical model using the feature data to generate clusters of data corresponding to similar parts; executing a hash operation on the data corresponding to similar parts; executing a quantization operation on the hashed data; executing a mapping operation on the hashed data to map similar parts to correspondingly similar bins based on results of the quantization operation, where the mapping operation generates binned part data including the hashed data and corresponding bins; and using the binned part data as an input for training the trained AI/ML parts similarity model.

At least one embodiment includes: automatically generating an order to obtain one or more of the compatible parts from a vendor. The trained AI/ML parts similarity model uses the part data for the part predicted to fail to provide information relating to parts that are compatible with the part predicted to fail.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
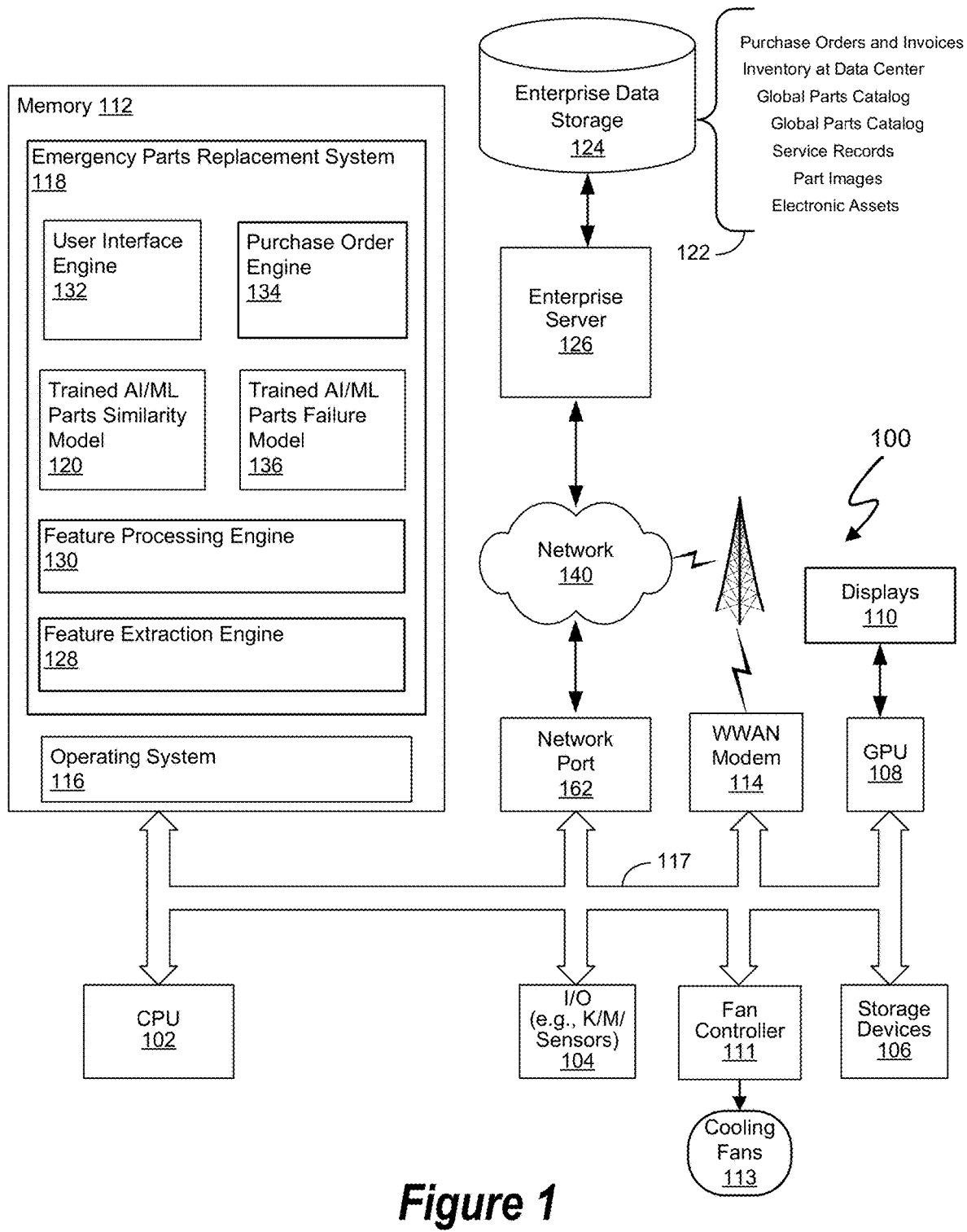
FIG. 1 is a generalized illustration of an information handling system (IHS) that is configured in accordance with certain embodiments of the system and method of the present disclosure.

Systems, methods, and computer-readable mediums are disclosed to maintain and repair electronic assets (e.g., servers, displays, mobile devices, laptop computers, desktop computers, routers, wireless access points, cables, etc.) of an organization. Certain embodiments of the disclosed systems are implemented with an appreciation that medium and large size datacenters may maintain a low-level inventory of essential parts, such as hard disk drives (HDDs), displays, graphics processing units (GPUs), cooling fans, cooling components, network cards, keyboard components, etc., that are needed to repair such electronic assets. When there is a failure of a part of an electronic asset, system administrators tasked with maintaining and repairing the organization's electronic assets look toward the low-level inventory of essential parts on hand to replace failed parts on demand.

Certain embodiments of the disclosed system are implemented with a recognition that there is no intelligent solution that can suggest what parts in the organization's inventory are compatible with the parts of the electronic asset that needs repair. While the system administrators can manage the inventory in their organization, the system administrators do not necessarily know and cannot readily obtain information identifying a part that is compatible with the part needed to repair the electronic asset. In some instances, the low-level inventory may include a compatible part, but the compatibility is not apparent to the system administrator. Additionally, in some instances, when the part cannot be found in the low-level inventory, it may be the case that a less critical electronic asset has parts that can be scavenged to urgently repair a more critical electronic asset.

Certain embodiments of the disclosed system address the problem of urgently identifying parts that are compatible with a part needed for replacement in the repair of an electronic asset using artificial intelligence/machine learning (AI/ML) models. In certain embodiments, the part data for a part needed to repair an electronic asset is provided to an input of a trained AI/ML parts similarity model that has been trained to determine similarities between parts, including parts used in a plurality of electronic assets of the organization. In certain embodiments, the trained AI/ML parts similarity model is trained using processed feature data extracted from a plurality of data sources having data relating to part numbers and corresponding part specifications for a plurality of parts, including parts used in the plurality of electronic assets. In certain embodiments, the trained AI/ML parts similarity model uses the part data to provide information relating to parts that are compatible with the part needed to repair the electronic asset. In certain embodiments, the information relating to compatible parts includes an identifier for compatible parts and a similarity score indicating how similar each compatible part is to the part that is to be used to service the electronic asset. Information relating to compatible parts may be provided to a user (e.g., at a user interface) to facilitate the service of the electronic asset.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a desktop or laptop computer, a mobile phone, a mobile tablet device, a network storage device, an intelligent device controlling operations on a manufacturing floor, or any other suitable device. An IHS may vary in size, shape, performance, functionality, and price. The IHS may include random access memory (RAM), one or more processing resources such as a central processing unit (CPU) or hardware or software control logic, ROM, and/or other non-volatile memory types. Additional components of the IHS may include one or more disk drives, one or more network ports for communicating with external devices, as well as various input and output (I/O) devices, such as a keyboard, a mouse, and a video display. The IHS may also include one or more buses operable to transmit communications between the various hardware components.

FIG. 1 is a generalized illustration of an IHS 100 that is configured in accordance with certain embodiments of the system and method of the present disclosure. The IHS 100 includes a processor (e.g., central processor unit or "CPU") 102, input/output (I/O) devices 104, such as a display, a keyboard, a mouse, thermal sensors, and associated controllers, and a hard drive or disk storage 106. The IHS 100 may also include one or more GPUs 108 configured to control one or more displays 110, and a fan controller 111 configured to control one or more cooling fans 113 used to cool the IHS 100.

In various embodiments, the IHS 100 also includes network port 162 and WWAN modem 114. The network port 162 may be configured to connect to a network 140, such as the Internet or other network for access to various servers, such as enterprise server 142. The WWAN modem 114 may be configured to connect to the network 140 using, for example, a mobile broadband communication standard.

The IHS 100 likewise includes system memory 112, which is interconnected to the foregoing via one or more buses 117. System memory 112 further comprises an operating system (OS) 116 and an emergency parts replacement system 118. In various embodiments, the emergency parts replacement system 118 is configured to obtain part data for a part that is to be used to service an electronic asset of the organization and to identify parts that are compatible with the part needed to service the electronic asset. In certain embodiments, the emergency parts replacement system 118 may also provide availability information relating to the compatible part.

The emergency parts replacement system 118 includes a trained AI/ML parts similarity model 120. As described herein, the trained AI/ML parts similarity model 120 is trained using processed feature data extracted from a plurality of data sources having data relating to part numbers and corresponding part specifications for a plurality of parts, including parts used in the organization's electronic assets. In certain embodiments, such as the example shown in FIG. 1, the trained AI/ML parts similarity model 120 is trained locally at the IHS 100. Additionally, or on the alternative, the trained AI/ML parts similarity model 120 may be trained at, for example, the site of an enterprise server 126 and deployed to one or more IHS. In certain embodiments, the IHS 100 is part of an enterprise network that includes the enterprise server 126. In certain embodiments, the functionality of the emergency parts replacement system 118 is distributed between networked IHSs so that the IHSs cooperate with one another to implement various aspects of the emergency parts replacement system 118.

In this example, the plurality of data sources 122 are stored in enterprise data storage 124 and are accessible by the IHS 100 over network 140 through enterprise server 126. Feature data may be extracted from the data sources 122 using a feature extraction engine 128. As described herein, the features that are extracted from the data sources 122 are dependent on the types of parts for which information is available in the data sources 122. The extracted features may be processed by a feature processing engine 130, which is configured to process the extracted features to place the features in a format suitable for input to train the trained AI/ML parts similarity model 120.

In certain embodiments, the emergency parts replacement system 118 includes a user interface engine 132, which facilitates user entry of part data (e.g., part number) for the part that has failed or is otherwise to be used to service the electronic asset. The part data provided by the user is submitted to the trained AI/ML parts similarity model, which identifies parts that are compatible with the entered part data and provides the identifications to the user on, for example, a display 110 through user interface engine 132. In certain embodiments, a user may submit a purchase order for a compatible part using a purchase order engine 134, which interfaces with the user through the user interface engine 132. In turn, the purchase order may be electronically submitted to a purchasing department of the organization or directly to a vendor for fulfillment.

Certain embodiments of the IHS 100 include a trained AI/ML parts failure model 136, which is configured to predict the failure of parts used in the organization's electronic assets. As is the case with the trained AI/ML parts similarity model 120, the trained AI/ML parts failure model 136 may be trained using one or more of the data sources 122. In one example, the features relevant to part failure are extracted by the feature extraction engine 128 and processed by the feature processing engine 130 to train the trained AI/ML parts failure model 136. As described herein, the specific features extracted from the data sources and used by trained AI/ML parts failure model 136 are dependent on the type of information available from the data sources 122. In certain embodiments, the trained AI/ML parts failure model 136 identifies part numbers that are rejected to fail within a predetermined period of time. The part numbers for parts projected to fail may be provided to the input of the trained AI/ML parts similarity model 120, which generates one or more recommendations for parts that are compatible with the parts projected to fail. In certain embodiments, such information may be used to preemptively and automatically generate a purchase order for parts that are compatible with parts that are projected to fail by the trained AI/ML parts failure model 136.

Figure 2:
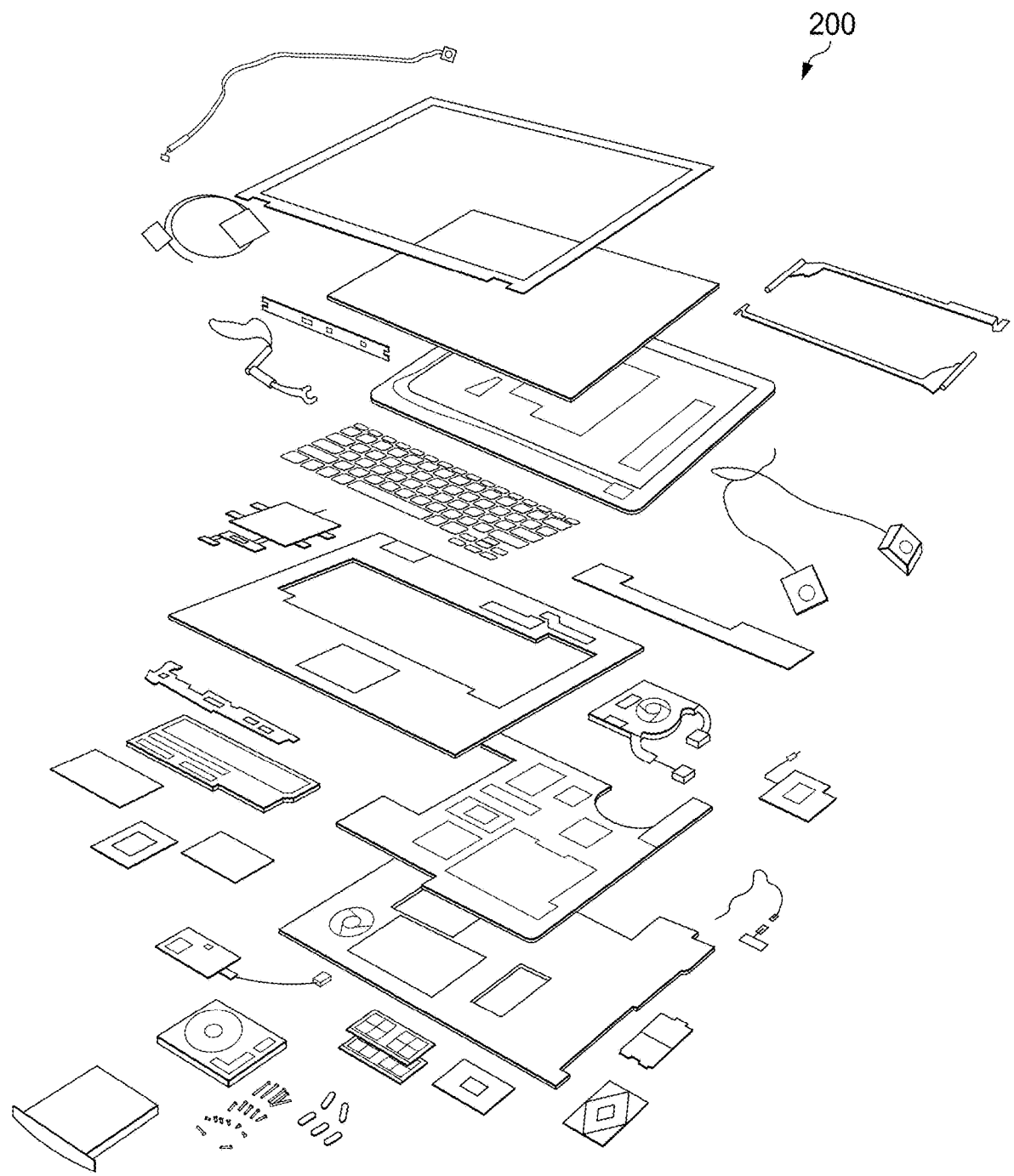
FIG. 2 is an exploded view of parts used in one example of an electronic asset, shown here as a laptop device.

FIG. 2 is an exploded view of parts used in one example of an electronic asset, shown here as a laptop device 200. As evident from FIG. 2, an electronic asset may include a substantial number of parts, each of which may need to be repaired when the electronic asset fails. If the electronic asset that fails is used in a critical device or system, embodiments of the disclosed system can be used to urgently identify parts that are compatible with the parts of the electronic asset, such as parts that are compatible with those shown in FIG. 2.

Figure 3:
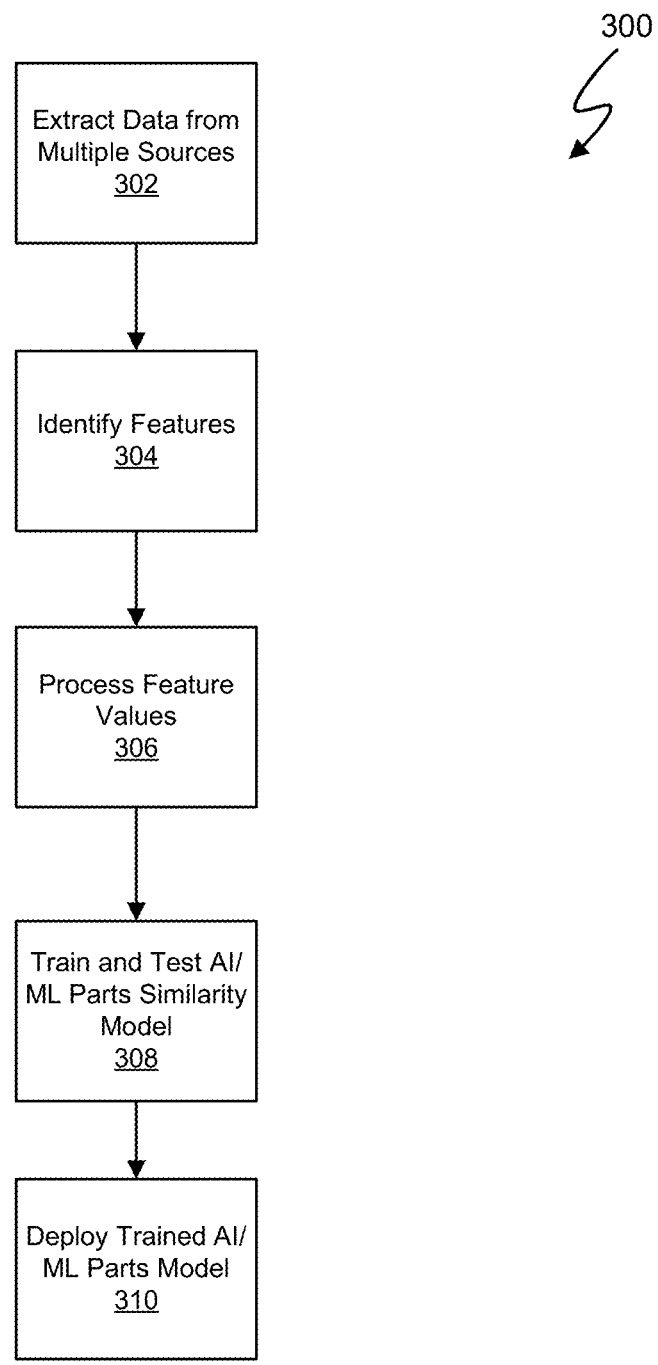
FIG. 3 is a flowchart showing exemplary operations that may be executed in certain embodiments of the disclosed system.

FIG. 3 is a flowchart 300 showing exemplary operations that may be executed in certain embodiments of the disclosed system. In this example, data may be extracted from multiple data sources (e.g., data sources 122) at operation 302. At operation 304, the extracted data is subject to feature engineering processes to identify features that are pertinent to determining parts that are compatible with one another. In certain embodiments, the feature data is extracted into a unified stack through feature value processing operations 306. The process feature values may be separated into training and testing datasets and used to train and test the AI/ML parts similarity model at operation 308. Once trained, the AI/ML parts similarity model may be deployed for use in one or more IHSs at operation 310. If the AI/ML parts similarity model has been trained locally at the IHS 100, the IHS 100 may deploy the trained AI/ML parts similarity model to other IHSs within the organization, if desired. If the AI/ML parts similarity model is trained remotely from the IHS 100, the trained AI/ML parts similarity model may be deployed from the system that trained at the AI/ML parts similarity model to the IHS 100.

Figure 4:
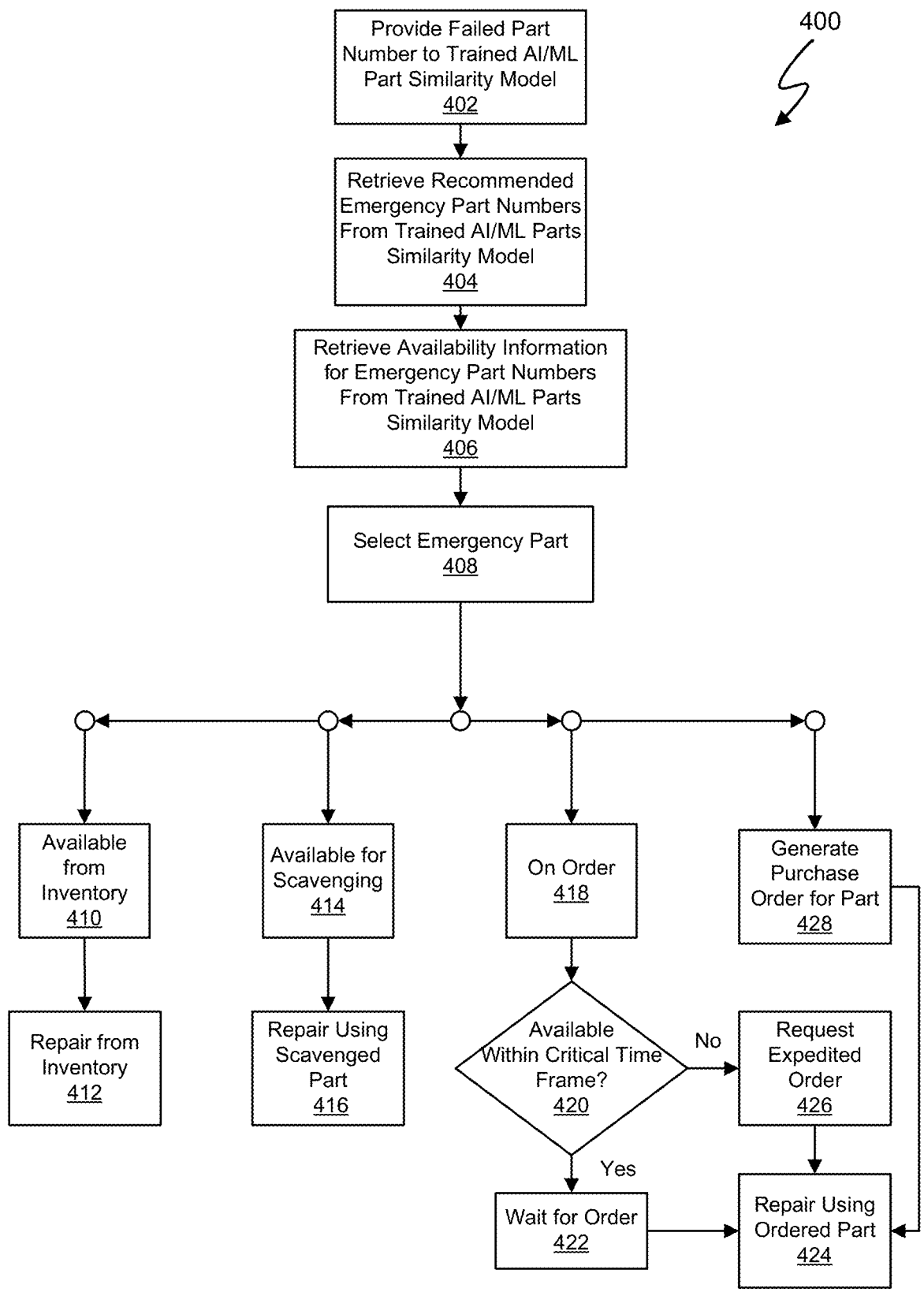
FIG. 4 is a flowchart showing exemplary operations that may be executed in certain embodiments of the disclosed system in the selection of compatible parts for repairing and/or replacing parts in an electronic asset.

FIG. 4 is a flowchart 400 showing exemplary operations that may be executed in certain embodiments of the disclosed system to select compatible parts for repairing and/or replacing parts in an electronic asset. In this example, part information (e.g., part number) for a part that is to be used to repair and/or upgrade an electronic asset is provided to a trained AI/ML parts similarity model at operation 402. The trained AI/ML parts similarity model uses the part information provided at operation 402 to identify and recommend using parts that are compatible with the provided part. The recommended part numbers are retrieved from the trained AI/ML parts similarity model at operation 404. In certain embodiments, the trained AI/ML parts similarity model also provides availability information for each of the recommended part numbers. The availability information for the part numbers is retrieved from the trained AI/ML parts similarity model at operation 406. In certain embodiments, the recommended part numbers and their corresponding availabilities are presented to a user at operation 408, where the user proceeds to select which of the recommended emergency parts are to be used to replace the failed part.

Subsequent actions used to obtain the compatible part depend on the availability of the compatible part. For example, if the selected part is available from the current inventory as determined at operation 410, the electronic asset may be repaired using the compatible part retrieved from inventory at operation 412.

In certain instances, the compatible part is not part of the current inventory of the organization. However, the trained AI/ML parts similarity model may be trained to locate compatible parts in other electronic assets of the organization. To this end, various electronic assets of the organization may use parts that are compatible with the electronic asset that is to be repaired. In such instances, the trained AI/ML parts similarity model may identify other electronic assets having a compatible part and note the availability of the compatible part for scavenging at operation 414. If the other electronic asset is less critical than the electronic asset that is to be repaired, the part may be scavenged from the other electronic asset and used to repair the electronic asset at operation 416. In certain embodiments, the trained AI/ML parts similarity model only identifies other electronic assets for scavenging if the other electronic assets are less critical than the electronic asset that is to be repaired. Additionally, or in the alternative, the trained AI/ML parts similarity model may identify the other electronic assets even if the other electronic assets have the same or greater criticality. In certain embodiments, the criticality of the other electronic assets may be expressly presented to the user. Additionally, or in the alternative, the criticality of the other electronic asset may be implicit from an ordered list of the other electronic assets that is presented to the user.

In certain instances, the selected part will not be available within the organization. However, the selected part may be included in an existing order that has been submitted to a vendor as determined at operation 418. If the selected part is included in an existing order, a determination may be made at operation 420 as to whether the selected part will be available within a critical time frame in which the electronic asset must be repaired. If the selected part will be available within the critical time frame, the user may opt to wait for the order at operation 422 and to repair the electronic asset using the ordered part at operation 424 once the selected part is delivered. If the selected part will not be available with critical time, a request to expedite the order may be made at operation 426, and in the electronic asset may be repaired using the ordered part at operation 424 once it has been delivered.

In some instances, the selected part will not be available within the organization nor included in an existing order. In such instances, the user may generate a purchase order for the selected part at operation 428 and repair the electronic asset using the ordered part at operation 424 once it has been delivered. In certain instances, the purchase order may include a request for expedited delivery of the selected part.

In certain embodiments, the purchase order for the selected part at operation 428 may be automatically generated and submitted directly to the purchasing department of the organization and/or a part vendor. Similarly, the request to expedite the delivery of the selected part in an existing purchase order at operation 426 may be automatically generated and submitted directly to the organization's purchasing department and/or a part vendor.

Figure 5:
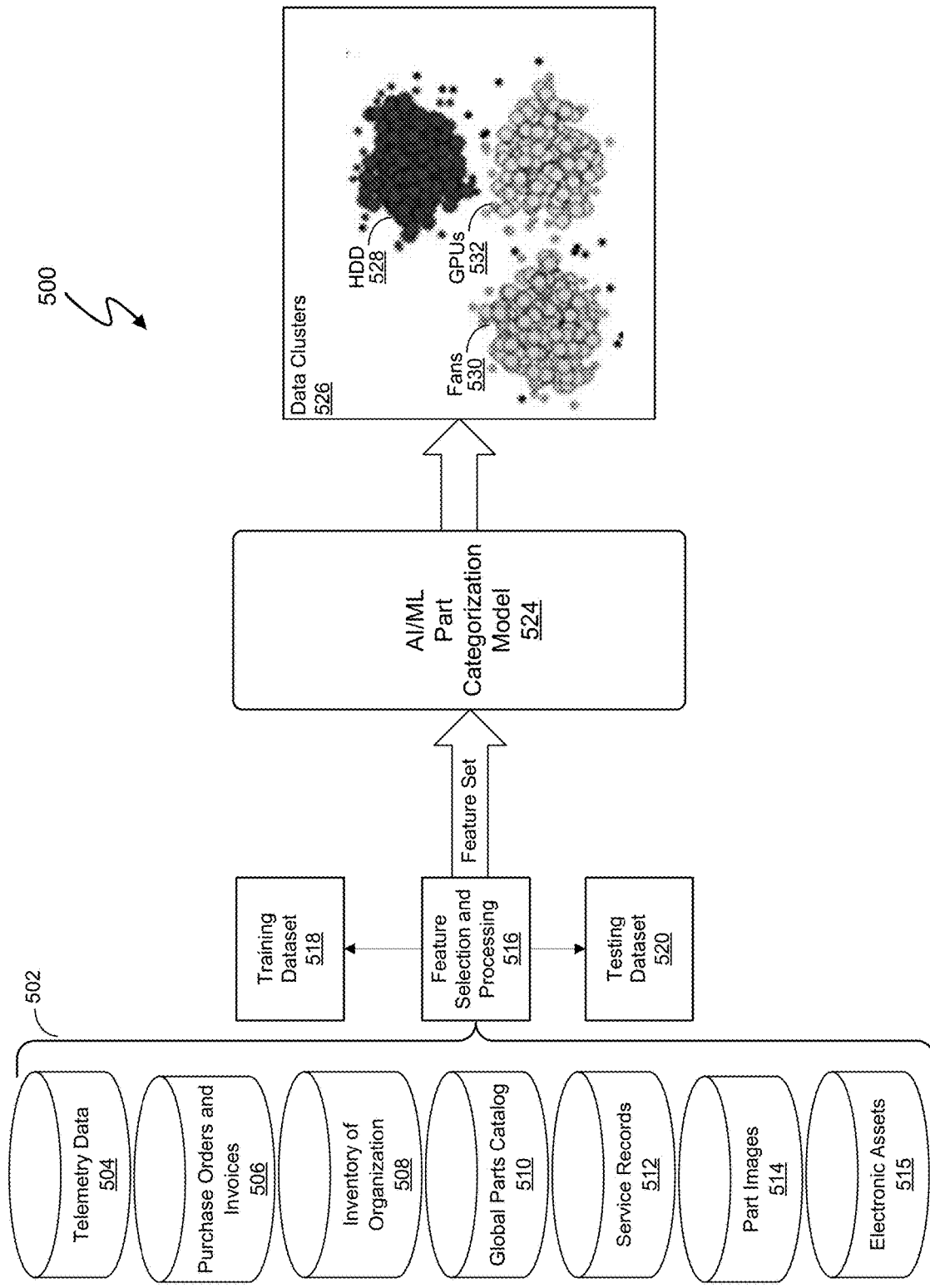
FIG. 5 is a block diagram of a system showing one manner in which unsupervised learning is used in certain embodiments to categorize parts based on their similarity.

In certain embodiments, the generation of a trained AI/ML parts similarity model may include both unsupervised learning and supervised learning. FIG. 5 is a block diagram of a system 500 showing one manner in which unsupervised learning is used in such embodiments to categorize parts based on their similarity.

FIG. 5 shows a system 500 in which information from a plurality of data sources 502 may be derived to classify parts pursuant to determining the compatibility between parts. In this example, the data sources 502 include one or more of 1) telemetry data 504, 2) purchase orders and invoices 506, 3) an inventory of parts at the organization 508, 4) a global parts catalog 510, 5) service records 512, 6) part images 514, and 7) database of electronic assets. In certain embodiments, telemetry data 504 includes data that may be used to assess the current health of electronic assets and/or parts deployed within the organization. In certain embodiments, the purchase orders and invoices 506 include data relating to parts and/or electronic assets that have been purchased by the organization. The purchase orders and invoices 506 may also include data relating to the actual delivery of parts and electronic assets as well as projected delivery dates for parts in the electronic asset that have been ordered by the organization. In certain embodiments, the inventory at the organization 508 includes information identifying parts and electronic assets that are currently available from the organization's inventory stockpile. In certain embodiments, a global parts catalog 510 includes part numbers and part specifications for all part types used in the electronic asset of the organization. The global parts catalog 510 may include part numbers and part specifications available from multiple vendors. In certain instances, different vendors may identify parts having similar part specifications using part numbers that are unique to the different vendors. Such information is useful in identifying compatible parts and the availability of such compatible parts. In certain embodiments, part images 514 of the parts in the global parts catalog 510 may be subject to image processing and used in the categorization and/or identification of compatible parts. In certain embodiments, the electronic assets 515 data source includes data relating to the electronic assets of the organization including, for example, an asset identifier, an asset classification, an indication of a criticality level of the asset is currently used in the organization, etc. In certain embodiments, the electronic assets 515 data source may also include more granular information such as, for example, the principal parts used in the electronic asset.

Service records 512 include information identifying electronic assets and/or corresponding parts that have been subject to service. Such service, for example, may include an identification of parts that have failed and been replaced, an identification of the parts used to replace failed parts, the dates of service, the reasons that the part failed, etc. In certain embodiments, the data in the service records 512 may assist in training one or more AI/ML models to identify compatible parts. Similarly, the data in service records 512 may assist in training one or more AI/ML models to project the failure of parts and/or electronic assets in the organization.

Data from data sources 502 is subject to feature selection and processing at operation 516. In various embodiments, only certain data fields in the data sources are selected as features. The specific features that are used may depend on the types of parts found in the data sources 502. As an example, selected features of a hard disk drive (HDD) may include features relating to the actual performance of the HDD as found in, for example, telemetry data 504. Actual performance features may include, for example, 1) the actual measured RPM of the HDD, 2) storage capacity of the HDD, 3) the actual read and/or write access speeds of the HDD, 4) the power consumed by the HDD, 5) the amount of storage used on the HDD, 6) the amount of storage available on the HDD, 7) the data throughput of the HDD, etc. It will be recognized, based on the teachings of the present disclosure, that other actual performance data may be selected as features of an HDD.

Selected features of an HDD may also include part specifications for the HDD as found in, for example, the global parts catalog 510. Examples of such features may include specifications relating to 1) the RPM of the HDD, 2) the specified storage capacity of the HDD, 3) the specified read and/or write access speeds of the HDD, 4) the specified power consumption of the HDD, 5) the specified dimensions of the HDD, 6) the type of connections used by the HDD (e.g., SCSI, PCI, USB, etc.), 7) pinouts for power and signals of the HDD, etc. It will be recognized, based on the teachings of the present disclosure, that other specification data may be selected as features of an HDD.

In certain embodiments, the selected features of HDD parts include service-related data, such as the data found in service records 512. Examples of service-related data include 1) the part numbers of HDDs used to replace other HDDs in servicing the electronic assets of the organization, 2) mean time between failures of an HDD, 3) the frequency of failure of an HDD, etc. It will be recognized, based on the teachings of the present disclosure, that other service-related data may be selected as features of an HDD.

In certain embodiments, the selected features of HDD parts include availability data obtained from purchase orders and invoices 506 and inventory of the organization 508. Examples of availability data include 1) HDDs currently on order by the organization, 2) delivery dates for HDDs currently on order, 3) order lead time for HDDs, 4) number of HDDs of different types in inventory, etc. It will be recognized, based on the teachings of the present disclosure, that other availability data may be selected as features of an HDD.

Cooling fans are also a frequent subject of upgrade and/or repair. For example, selected features of a cooling fan may include features relating to the actual performance of the cooling fan as found in, for example, telemetry data 504. Actual performance features may include, for example, 1) the actual measured RPM of the cooling fan, 2) the actual power consumed by the cooling fan, 3) the actual range of RPM used by the cooling fan during operation, 4) the range of temperatures in which the cooling fan is operated, etc. it will be recognized, based on the teachings of the present disclosure, that other actual performance data may be selected as features of a cooling fan.

Selected features of a cooling fan may also include part specifications for the cooling fan as found in, for example, the global parts catalog 510. Examples of such features may include specifications relating to 1) the recommended RPM of the cooling fan, 2) the specified temperature range of operation of the cooling fan, 3) the specified power consumption of the cooling fan, 4) the specified dimensions of the cooling fan, 5) the type of connections used by the cooling fan, 6) pinouts for power and signals of the cooling fan, etc. It will be recognized, based on the teachings of the present disclosure, that other specification data may be selected as features of a cooling fan.

In certain embodiments, the selected features of a cooling fan include service-related data, such as the data found in service records 512. Examples of service-related data include 1) the part numbers of cooling fans used to replace other cooling fans in servicing the electronic assets of the organization, 2) mean time between failures of a cooling fan, 3) the frequency of failure of a cooling fan, etc. It will be recognized, based on the teachings of the present disclosure, that other service-related data may be selected as features of a cooling fan.

In certain embodiments, the selected features of a cooling fan include availability data obtained from purchase orders and invoices 506 and inventory of the organization 508. Examples of availability data include 1) cooling fans currently on order by the organization, 2) delivery dates for cooling fans currently on order, 3) order lead time for cooling fans, 4) number of cooling fans of different types in inventory, etc. It will be recognized, based on the teachings of the present disclosure, that other availability data may be selected as features of a cooling fan.

GPU cards are also a frequent subject of upgrade and/or repair. For example, selected features of a GPU card may include features relating to the actual performance of the GPU card as found in, for example, telemetry data 504. Actual performance features may include, for example, 1) the actual clock speed of the processors and/or processor cores on the GPU card, 2) the number of processors and/or cores utilized by the GPU card, 3) the types of processors and/or cores utilized by the GPU card, 4) the total amount memory on the GPU card, 5) statistics relating to the processor and memory usage during operation of the GPU card, 6) the actual power consumed by the GPU card, 7) the range of temperatures in which the GPU card is operated, 8) temperature statistics for the processing cores of the GPU card, etc. It will be recognized, based on the teachings of the present disclosure, that other actual performance data may be selected as features of a GPU card.

Selected features of a GPU card may also include part specifications for the GPU card as found in, for example, the global parts catalog 510. Examples of such features may include specifications relating to 1) the number and types of processors and/or cores used by the GPU card, 2) the total amount of video memory available on the GPU card, 2) the specified temperature range of operation of the GPU card, 3) the clock speeds of the processors and/or cores of the GPU card, 4) the rendering speeds of the GPU card, 5) the operating system of the GPU card, 6) the specified power consumption of the GPU card, 7) the specified dimensions of the GPU card, 8) the type of connections used by the GPU card, 9) pinouts for power and signals of the GPU card, etc. It will be recognized, based on the teachings of the present disclosure, that other specification data may be selected as features of a GPU card.

In certain embodiments, the selected features of a GPU card include service-related data, such as the data found in service records 512. Examples of service-related data include 1) the part numbers of GPU cards used to replace other GPU cards in servicing the electronic assets of the organization, 2) mean time between failures of a GPU card, 3) the frequency of failure of a GPU card, etc. It will be recognized, based on the teachings of the present disclosure, that other service-related data may be selected as features of a GPU card.

In certain embodiments, the selected features of a GPU card include availability data obtained from purchase orders and invoices 506 as well as the inventory of the organization 508. Examples of availability data include 1) GPU cards currently on order by the organization, 2) delivery dates for GPU cards currently on order, 3) order lead time for GPU cards, 4) the number of GPU cards of different types in inventory, etc. It will be recognized, based on the teachings of the present disclosure, that other availability data may be selected as features of a GPU card.

In certain embodiments, some features of a part may have large values while other features have small values. To ensure that features having larger values do not inordinately contribute to the training of the various AI/ML models discussed herein, the feature values may be subject to a logarithmic conversion operation to scale the feature values to a predetermined range.

Based on the teachings of the present disclosure, it will be recognized that the types of parts and corresponding features are quite extensive and diverse. Accordingly, only a limited set of part types and features have been identified and discussed herein. However, the teachings of the present disclosure extend to a numerous range of part types and corresponding features other than the examples set forth herein. The foregoing part types and corresponding features are presented as non-limiting examples.

In certain embodiments, the processed data resulting from the feature selection and processing may be used to generate a training dataset 518 and a testing dataset 520. As described herein, the training dataset 518 and testing dataset 520 may be used to train and test the AI/ML parts similarity model.

In the example shown in FIG. 5, the processed data resulting from the feature selection and processing is provided to the input of an AI/ML part categorization model 524. The AI/ML part categorization model 524 operates in an unsupervised mode and outputs data clusters 526 that correspond to classifications of similar parts. The data clusters 526 are derived by the AI/ML part categorization model 524 from features extracted and processed from data sources 502.

For purposes of simplicity, only three categorical data clusters are shown in FIG. 5. The categorical data within each cluster corresponds to parts having similar characteristics. Parts nearest one another within a group have characteristics that are more similar to one another than parts within the group that are spaced from one another. In this example, data cluster 528 has been assigned a classification label of "HDD" and includes data points corresponding to respective HDDs. Data cluster 530 has been assigned a classification label of "Fans" and includes data points corresponding to respective cooling fans. Data cluster 532 has been assigned a classification label of "GPUs" and includes data points corresponding to respective GPU cards. It will be recognized, in view of the teachings of the present disclosure, that the AI/ML part categorization model 524 may generate a significant number of different data clusters representing different types of parts and that the three data clusters that are shown in FIG. 5 constitute non-limiting examples.

In certain embodiments, the data clusters 526 undergo a locality hashing operation in which hash values for similar parts are stored in the same bin. Accordingly, compatible parts are more likely to be found in the same bin. When a hash value for a part is known, a bin with the hash value is located. In certain embodiments, a nearest neighbor operation may be executed using the hash value to locate the most similar hash values within the same bin. Neighboring hash values that are nearer in distance to one another are more likely to be similar, and hash values that are farther in distance from one another are less similar. In certain embodiments, the distance between hash values for different parts may be translated to a similarity score, which may be presented along with the part numbers to identify compatible parts.

Figure 6:
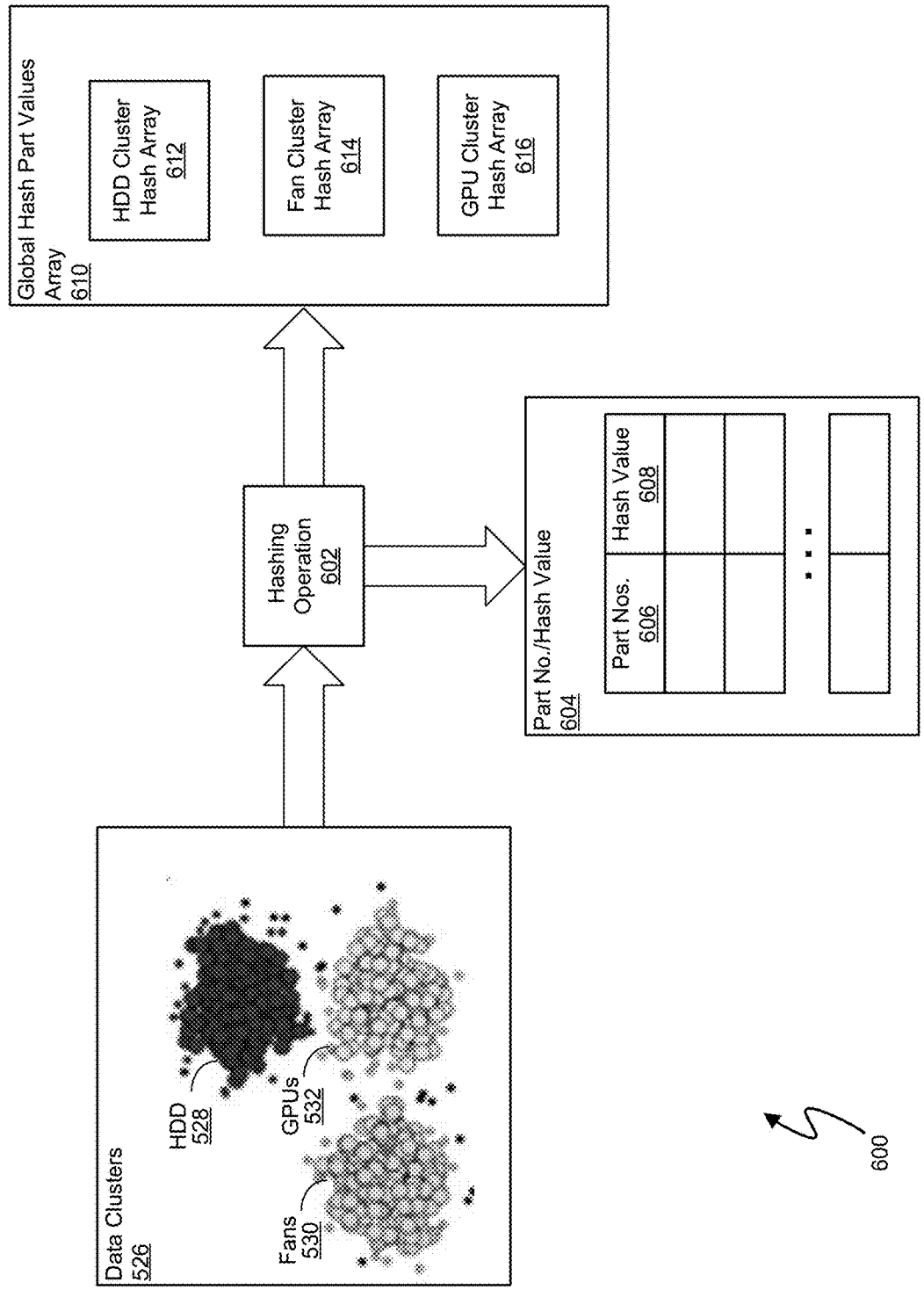
FIG. 6 is a block diagram depicting one example of how the data clusters shown in FIG. 5 may be processed pursuant to generating hashed part values that may be localized within multiple bins.

FIG. 6 is a block diagram 600 depicting one example of how the data clusters 526 may be processed pursuant to generating hashed part values that may be localized within multiple bins. In this example, the data points of the data clusters are subject to a hashing operation at operation 602. In certain embodiments, a hash table 604 is generated that correlates part numbers 606 with their respective hash values 608. In this example, an array of hashed part values is generated for use in executing binning operations in which similar parts are placed in the same bins. In certain embodiments, the global hash part values are placed in a single global hash part values array 610. Additionally, or in the alternative, individual hash part value arrays may be generated for each cluster of the data clusters 526. In FIG. 6, for example, the data points in HDD cluster 528 have been hashed to generate a corresponding HDD cluster hash array 612. Also, the data points of and cluster 530 have been hashed to generate a corresponding fan cluster hash array 614. Likewise, the data points of GPU cluster 532 have been hashed to generate a corresponding GPU cluster hash array 616.

Figure 7:
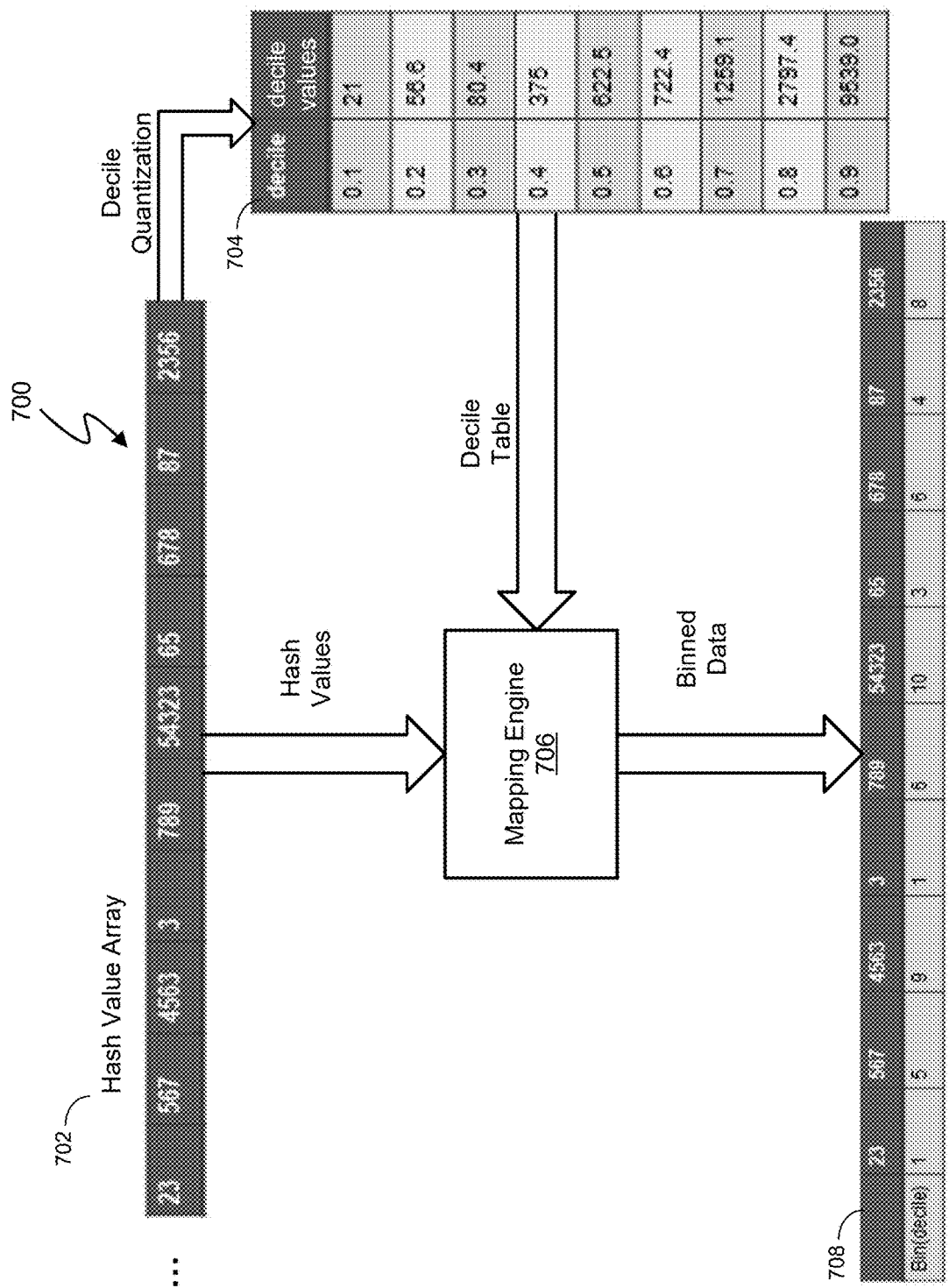
FIG. 7 is a block diagram depicting one manner in which hash values in a hash part value array may be stored in bins with other similar hash values.

FIG. 7 is a block diagram 700 depicting one manner in which the hash values in the hash part value arrays may be stored in bins with other similar hash values. In certain embodiments, all values of the global hash part values array 610 are addressed for placement in a single set of bins. Additionally, or on the alternative, the hash values for each cluster hash array are addressed individually so that each cluster hash array has its own set of bins. As an example, a first set of bins may be generated for hash values in the HDD cluster hash array 612, a second set of bins for hash values in the fan cluster hash array 614, and a third set of bins for hash values in the GPU cluster hash array 616.

In the example shown in FIG. 7, the values of the hash value array 702 are subject to a deciles quantization operation to generate a deciles table 704. Here, the deciles table 704 includes a decile number and corresponding decile value. As shown, the 0.1 decile corresponds to a decile value of 21, the 0.2 decile to decile value 56.6, the 0.3 decile to decile value 80.4, etc. It will be understood that the specific decile values are depended on the data of the hash value array 702.

In the embodiment shown in FIG. 7, the deciles table 704 is used by a mapping engine 706 to paste the hash values of the hash value array 702 in corresponding bins 708. In this example, the values of the hash value array 702 are distributed to ten bins corresponding to the deciles of deciles table 704. Using the deciles table 704, the mapping engine 706 has mapped hash value 23 to bin(1), hash value 567 to bin(5), hash value 4563 to bin(9), hash value 3 to bin(1), etc. In this manner, similar hash values, representing similar parts, are placed in the same bin. In the example, hash value 23 and hash value 3 had both been placed in bin(1). Therefore, the parts corresponding to hash value 23 and hash value 1 are likely to be compatible. This same assumption extends to hash values grouped in other bins. As more hash values corresponding to different parts are added to each bin, the similarity between one part in the bin and other parts in the bin may be further granularized by applying a distance operation that measures the distance between the hash values of the different parts. Different parts having less distance between one another are more likely to be compatible than different parts having a greater distance between one another. In certain embodiments, the distance between a given part in a bin and other parts in the same bin may be used to generate a similarity score that represents a degree of compatibility between the given part and the other parts, where, for example, higher similarity scores are assigned to parts that are less distant from the given part than parts having a greater distance from the given part.

Figure 8:
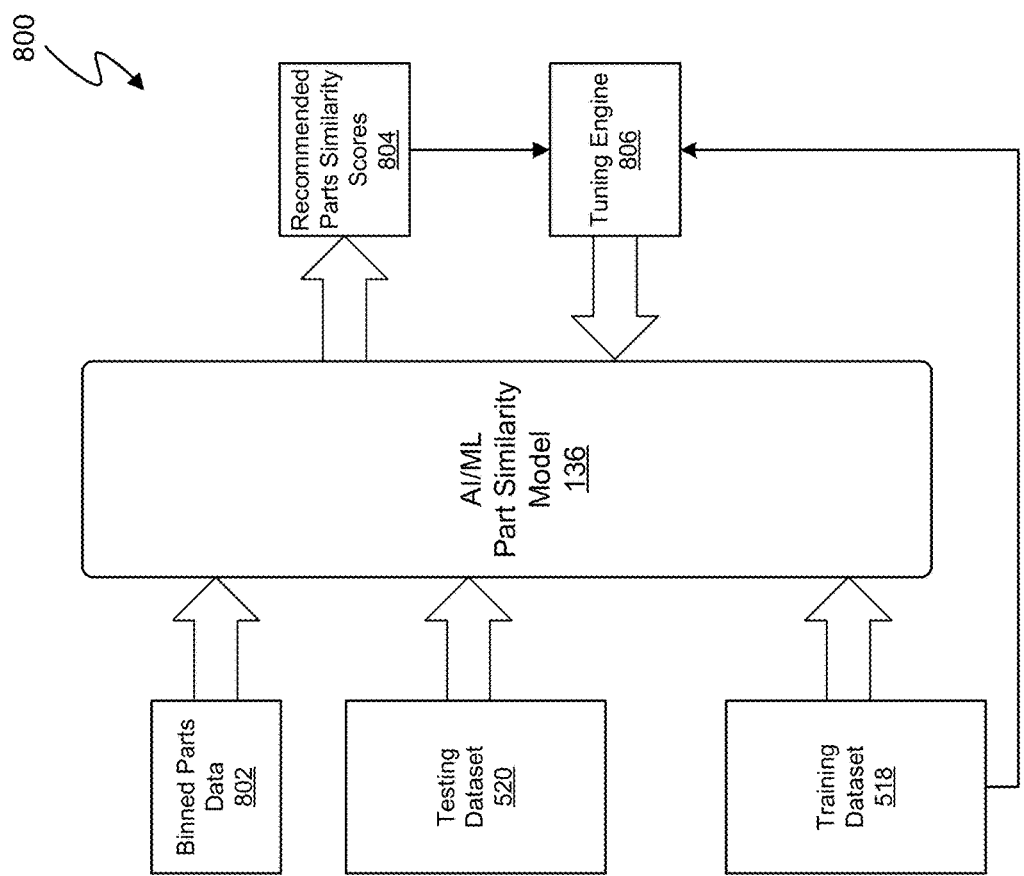
FIG. 8 is a block diagram showing one manner in which an AI/ML part similarity model may be trained.

FIG. 8 is a block diagram 800 showing one manner in which the AI/ML part similarity model 120 may be trained. In this example, the operations shown in FIG. 7 have resulted in a table of binned parts data 802. The binned parts data 802 and training dataset 518 (see FIG. 5) are provided to the input of the AI/ML part similarity model 120, which uses the binned parts data 802 and training dataset 518 to generate recommended parts and similarity scores 804. The recommended parts and similarity scores 804 are compared with representative outcomes in the training dataset 518 by a tuning engine 806, which is configured to tune the arrangement and/or parameters of the AI/ML part similarity model 120. Once the tuning engine 806 has tuned the AI/ML part similarity model 120, the accuracy of the AI/ML part similarity model 120 may be tested using the testing dataset 520

(see FIG. 5). In certain embodiments, recommended parts include alternative compatible parts, where the alternative parts include parts not currently used in any of the plurality of electronic assets but available from one or more vendors.

Figure 9:
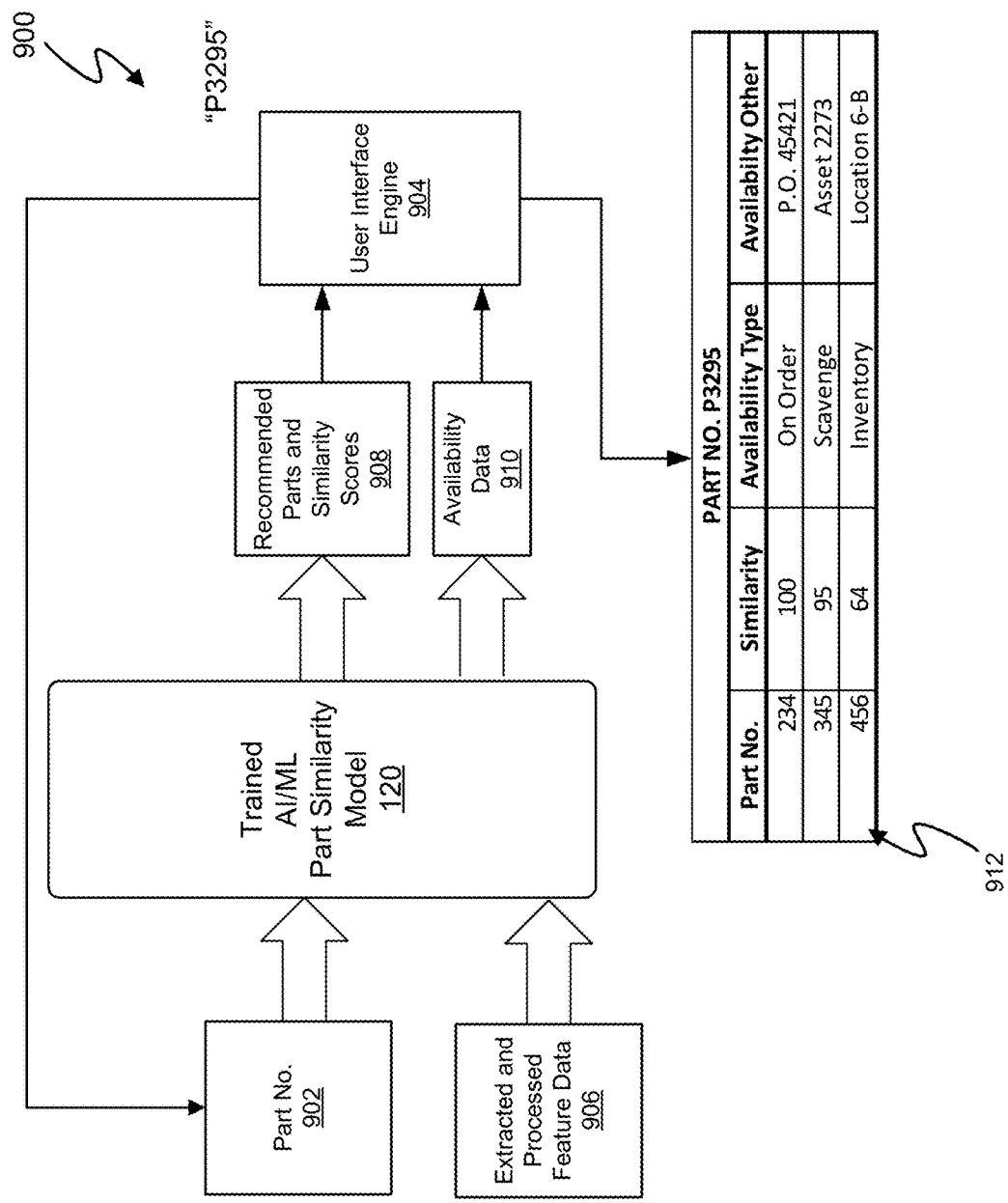
FIG. 9 is a block diagram depicting one example of how a trained AI/ML similarity part model may be used.

FIG. 9 is a block diagram 900 depicting one example of how the trained AI/ML similarity part model 120 may be used. In this example, a part number 902 is provided by a user through a user interface engine 904 to the input of the trained AI/ML part similarity model 120. In certain embodiments, extracted and processed feature data 906 is also provided to the input of the trained AI/ML part similarity model 120. The trained AI/ML part similarity model 120 uses the part number 902 and/or extracted and processed feature data 906 to generate recommended parts and similarity scores 908, which are presented to the user on, for example, a display through the user interface engine 904.

In certain embodiments, the trained AI/ML part similarity model 120 also generates availability data 910 for the recommended parts. Additionally, or in the alternative, the recommended parts may be provided to an input of a search engine (not shown), which may be used to search one or more databases of the organization to provide availability data for the part. In certain embodiments, the availability data includes an availability type (in order, scavenge, inventory, etc.) as well as other availability information to the part. The availability data for the recommended parts may be presented to the user on, for example, a display through the user interface engine 904.

Table 912 depicts an exemplary output that may be displayed to the user. In this example, the user has input part number P3295 using the user interface engine 904, which provides the part number P3295 as the part number 902 input to the trained AI/ML part similarity model 120. Here, the trained AI/ML part similarity model 120 has identified three parts that are potentially compatible with part number P3295 along with corresponding similarity scores. In table 912, part number 136 has been identified as compatible with part number P3295 with a similarity score of 100, indicating substantially perfect compatibility between the parts. Part number 345 has been identified as compatible with part number P3295 with a similarity score of 95, indicating significant compatibility between the parts. Part number 456 has been identified as compatible with part number P3295 with a similarity score of 64, indicating moderate compatibility between the parts. In certain embodiments, the part numbers presented in table 912 are the hash values for the parts, which may be correlated to the actual part numbers using hash table 604 (see FIG. 6). In other embodiments, the part numbers presented in table 912 have already been correlated and include the actual part numbers of the parts. It will be recognized, based on the teachings of the present disclosure, that the identification of compatible parts to the user may be undertaken in various manners, the foregoing being non-limiting examples.

Table 912 also presents availability information for each part to the user. In this example, part number 136 has been detected as being in order in P.O. 45241. In certain embodiments, the "P.O.4521" text in the table may be a link to the corresponding purchase order. As also shown in this example, part number 345 is available for scavenge from another electronic asset of the organization. Here, part number 345 may be scavenged from Asset 2273. In certain embodiments, the "Asset 2273" text in the table may be a link to the more detailed information regarding the asset, including where the asset may be located. Further, part number 456 is available from inventory at Inventory Location 6B. In certain embodiments, the "Inventory Location 6B" text in the table may be a link to a corresponding map showing location 6B. It will be recognized, based on the teachings of the present disclosure, that more information than that shown in table 912 as well as less information than that shown in table 912 may be provided to the user, the foregoing showing non-limiting examples.

Figure 10:
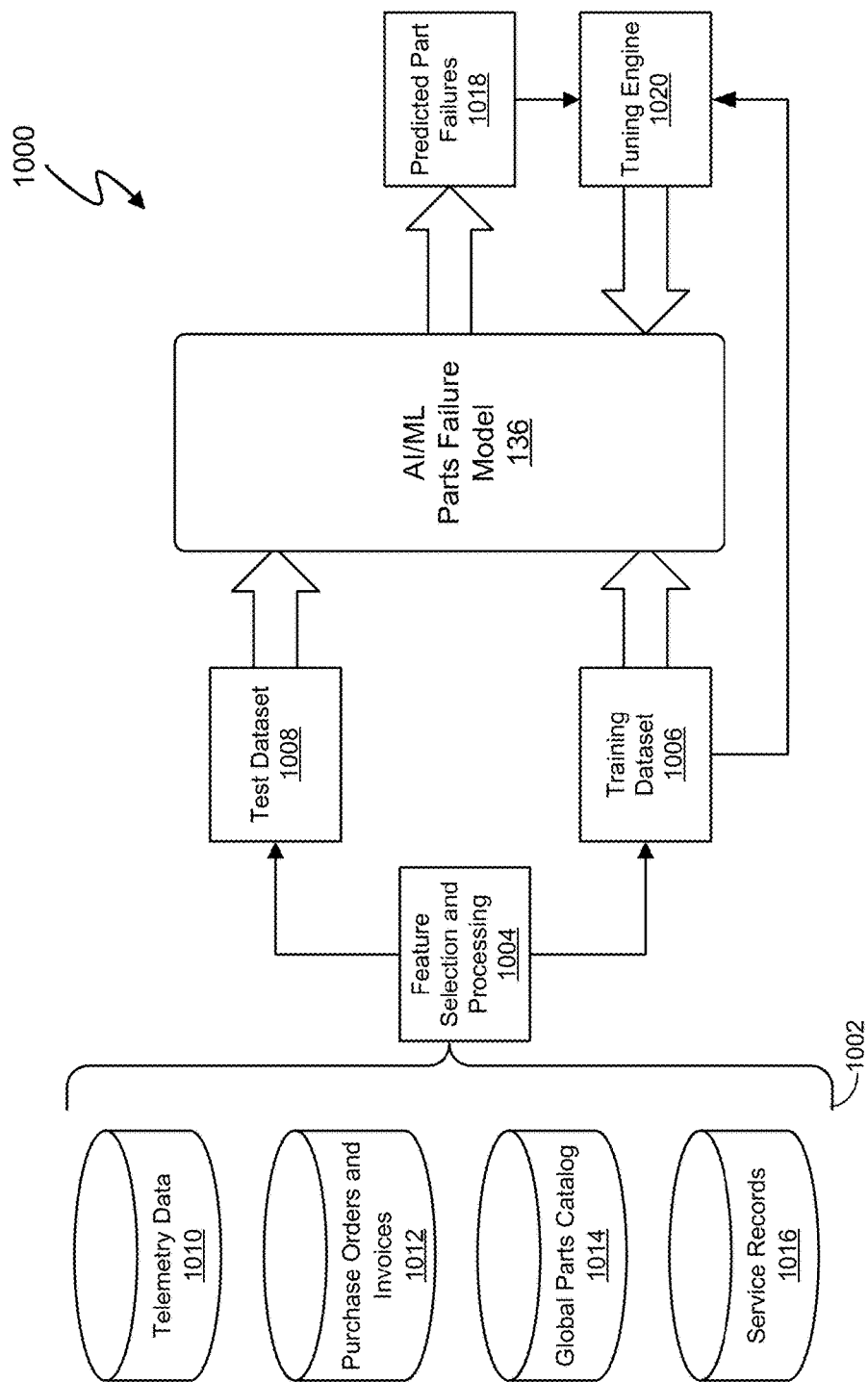
FIG. 10 is a block diagram depicting an exemplary manner in which certain embodiments of an AI/ML parts failure model may be trained.

FIG. 10 is a block diagram 1000 depicting an exemplary manner in which certain embodiments of an AI/ML parts failure model 136 may be trained. In this example, a plurality of data sources 1002 are subject to feature selection and processing 1004 to generate a training dataset 1006 and test dataset 1008. In certain embodiments, the plurality of data sources 1002 include telemetry data 1010, purchase orders and invoices 1012, a global parts catalog 1014, and service records 1016.

The training dataset 1006 is provided to the input of the AI/ML parts failure model 136, which uses the input to generate predicted part failures 1018. The predicted part failures 1018 are provided to a tuning engine 1020 for comparison with outcomes from the training dataset 1006. The predicted part failures 1018 are compared with representative outcomes in the training dataset 1006 by a tuning engine 1020, which is configured to tune the arrangement and/or parameters of the AI/ML parts failure model 136. Once the tuning engine 1020 has tuned the AI/ML parts failure model 136, the accuracy of the AI/ML parts failure model 136 may be tested using the testing data set 1008.

Figure 11:
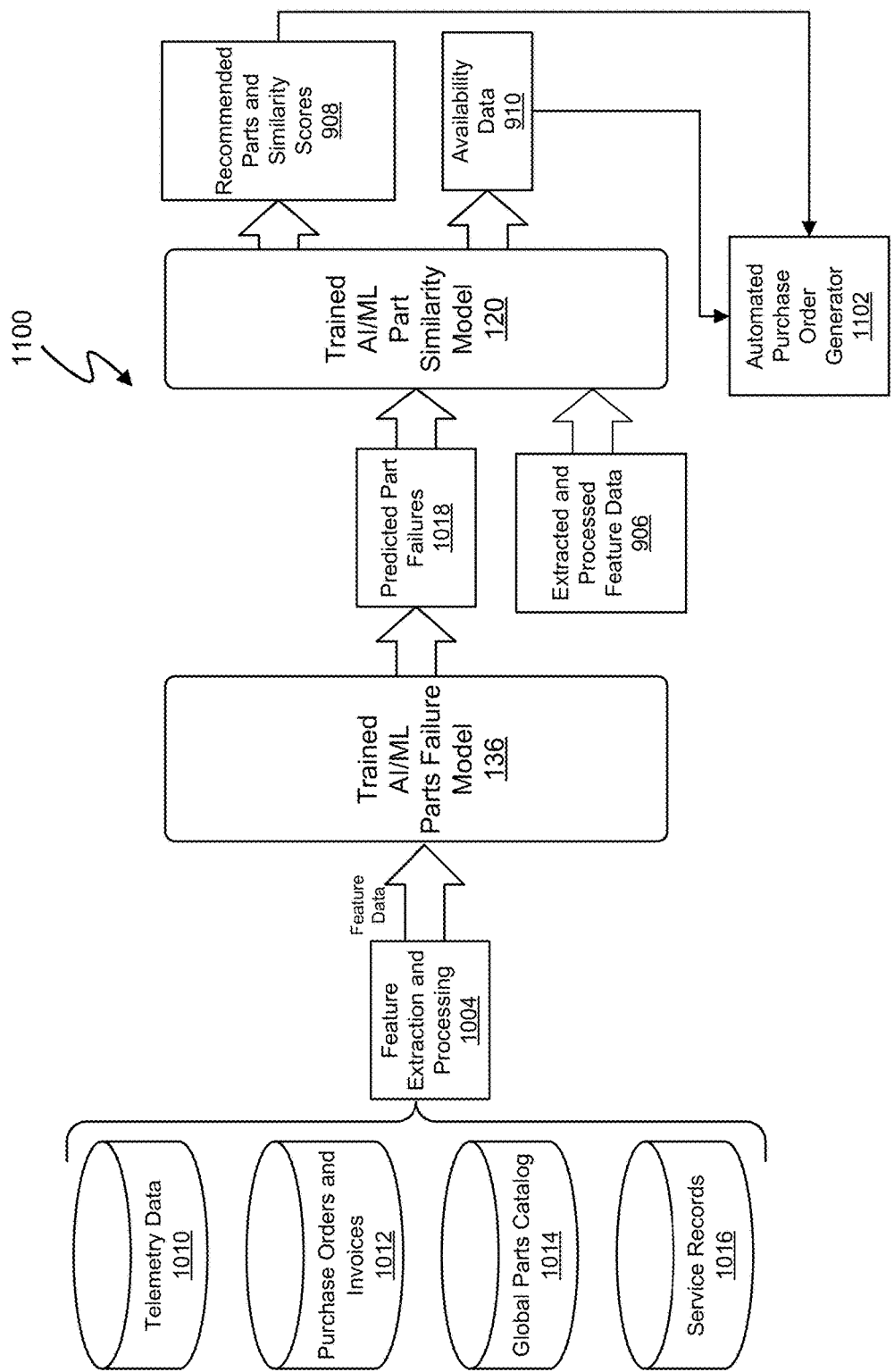
FIG. 11 shows an exemplary system that integrates a trained AI/ML parts failure model with a trained AI/ML part similarity model.

FIG. 11 shows an exemplary system 1100 that integrates the trained AI/ML parts failure model 136 with the trained AI/ML part similarity model 120. In this example, the trained AI/ML parts failure model 136 identifies predicted part failures 1018. Part numbers that are predicted to fail are provided to the input of the trained AI/ML part similarity model 120. In turn, the trained AI/ML part similarity model 120 identifies recommended parts and corresponding similarity scores 908 and, in certain embodiments, availability data 910 for the recommended parts. In certain embodiments, the recommended parts and similarity scores 908 and availability data 910 are provided to an automated purchase order generator 1102. In certain embodiments, the automated purchase order generator 1102 uses the recommended parts and similarity scores 908 and availability data 910 to determine whether parts that are compatible with a hard predicted to fail should be ordered. In certain embodiments, only parts having at least a threshold similarity score to the part predicted to fail are considered in an order determination. In certain embodiments, the compatible part is only ordered if the inventory for the compatible part is below a threshold value. If the automated purchase order generator 1102 determines that a compatible part should be ordered, the generator 1102 automatically generates a purchase order that may be provided to a purchasing department of the organization or sent to a vendor of the compatible part.

In certain embodiments, the trained AI/ML parts failure model 136 generates a set of predicted part failures 1018 in response to a predetermined condition. In certain embodiments, the predetermined condition may be based on a determination that a part has failed or is in imminent danger of failing. In certain embodiments, the predetermined condition may be based on a predicted failure schedule (e.g., periodically, daily, weekly, etc.)

As will be appreciated by one skilled in the art, the disclosed system may be embodied as a method, system, or computer program product. Accordingly, embodiments of the disclosed system may be implemented in hardware, in software (including firmware, resident software, microcode, etc.) or in an embodiment combining software and hardware. Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention. Consequently, the invention is intended to be limited only by the spirit and scope of the appended claims, giving full cognizance to equivalents in all respects.

What is claimed is:

1. A computer-implemented method comprising:
    obtaining part data for a part that is to be used to service an electronic asset of an organization;
    providing the part data to an input of a trained AI/ML parts similarity model that has been trained to determine similarities between parts, including parts used in a plurality of electronic assets of the organization, wherein
        the trained AI/ML parts similarity model is trained using processed feature data extracted from a plurality of data sources having data relating to part numbers and corresponding part specifications for a plurality of parts, including parts used in the plurality of electronic assets,
        the trained AI/ML parts similarity model uses the part data to provide information relating to parts that are compatible with the part, and
        the information relating to compatible parts includes an identifier for compatible parts and a similarity score indicating how similar each compatible part is to the part that is to be used to service the electronic asset, the similarity score representing a degree of compatibility between the part and the each compatible part; and
    providing the information relating to compatible parts to a user to facilitate service of the electronic asset; and
    wherein
    the plurality of data sources includes one or more of:
        telemetry data for parts used in the plurality of electronic assets;
        purchase orders for parts used in the plurality of electronic assets;
        invoices for parts used in the plurality of electronic assets;
        inventory data for parts used in the plurality of electronic assets;
        service records relating to the plurality of electronic assets;
        service records for parts used in the plurality of electronic assets; and
        a parts catalog for parts used in the plurality of electronic assets; and,
    training of the trained AI/ML parts similarity model comprises:
        extracting and selecting feature data from the plurality of data sources;
        executing an unsupervised AI/ML categorical model using the feature data to generate clusters of data corresponding to similar parts;

executing a hash operation on the data corresponding to similar parts;

executing a quantization operation on the hashed data;

executing a mapping operation on the hashed data to map similar parts to correspondingly similar bins based on results of the quantization operation, wherein the mapping operation generates binned part data including the hashed data and corresponding bins; and using the binned part data as an input for training the trained AI/ML parts similarity model.

2. The computer-implemented method of claim 1, wherein the trained AI/ML parts similarity model further provides information relating to availability of one or more of the compatible parts.

3. The computer-implemented method of claim 1, wherein the trained AI/ML parts similarity model is further configured to identify alternative parts that are compatible with the part, wherein the alternative parts include parts not currently used in any of the plurality of electronic assets.

4. The computer-implemented method of claim 1, further comprising:

automatically generating an order to obtain one or more of the compatible parts from a vendor.

5. The computer-implemented method of claim 1, further comprising:

using a trained AI/ML parts failure model to predict failure of a part used in an electronic asset; and providing part data for the part predicted to fail to an input of the trained AI/ML parts similarity model, wherein the trained AI/ML parts similarity model uses the part data for the part predicted to fail to provide information relating to parts that are compatible with the part predicted to fail.

6. A system comprising:

one or more information handling systems, wherein the one or more information handling systems include:

a processor;

a data bus coupled to the processor; and a non-transitory, computer-readable storage medium embodying computer program code, the non-transitory, computer-readable storage medium being coupled to the data bus;

wherein the computer program code included in one or more of the information handling systems is executable by the processor of the information handling system so that the information handling system, alone or in combination with other information handling systems, executes operations comprising:

obtaining part data for a part that is to be used to service an electronic asset of an organization;

providing the part data to an input of a trained AI/ML parts similarity model that has been trained to determine similarities between parts, including parts used in a plurality of electronic assets of the organization, wherein the trained AI/ML parts similarity model is trained using processed feature data extracted from a plurality of data sources having data relating to part numbers and corresponding part specifications for a plurality of parts, including parts used in the plurality of electronic assets, the trained AI/ML parts similarity model uses the part data to provide information relating to parts that are compatible with the part, and the information relating to compatible parts includes an identifier for compatible parts and a similarity score indicating how similar each compatible part is to the part that is to be used to service the electronic asset, the similarity score representing a degree of compatibility between the part and the each compatible part; and providing the information relating to compatible parts to a user to facilitate service of the electronic asset; and wherein the plurality of data sources includes one or more of:

telemetry data for parts used in the plurality of electronic assets;

purchase orders for parts used in the plurality of electronic assets;

invoices for parts used in the plurality of electronic assets;

inventory data for parts used in the plurality of electronic assets;

service records relating to the plurality of electronic assets;

service records for parts used in the plurality of electronic assets; and a parts catalog for parts used in the plurality of electronic assets; and, training of the trained AI/ML parts similarity model comprises:

extracting and selecting feature data from the plurality of data sources;

executing an unsupervised AI/ML categorical model using the feature data to generate clusters of data corresponding to similar parts;

executing a hash operation on the data corresponding to similar parts;

executing a quantization operation on the hashed data;

executing a mapping operation on the hashed data to map similar parts to correspondingly similar bins based on results of the quantization operation, wherein the mapping operation generates binned part data including the hashed data and corresponding bins; and using the binned part data as an input for training the trained AI/ML parts similarity model.

7. The system of claim 6, wherein the trained AI/ML parts similarity model further provides information relating to availability of one or more of the compatible parts.

8. The system of claim 6, wherein the trained AI/ML parts similarity model is further configured to identify alternative parts that are compatible with the part, wherein the alternative parts include parts not currently used in any of the plurality of electronic assets.

9. The system of claim 6, wherein the operations further comprise:

automatically generating an order to obtain one or more of the compatible parts from a vendor.

10. The system of claim 6, wherein the operations further comprise:

using a trained AI/ML parts failure model to predict failure of a part used in an electronic asset; and providing part data for the part predicted to fail to an input of the trained AI/ML parts similarity model, wherein the trained AI/ML parts similarity model uses the part data for the part predicted to fail to provide information relating to parts that are compatible with the part predicted to fail.

11. A non-transitory, computer-readable storage medium embodying computer program code, the computer program code comprising computer executable instructions configured for:
    obtaining part data for a part that is to be used to service an electronic asset of an organization;
    providing the part data to an input of a trained AI/ML parts similarity model that has been trained to determine similarities between parts, including parts used in a plurality of electronic assets of the organization, wherein
        the trained AI/ML parts similarity model is trained using processed feature data extracted from a plurality of data sources having data relating to part numbers and corresponding part specifications for a plurality of parts, including parts used in the plurality of electronic assets,
        the trained AI/ML parts similarity model uses the part data to provide information relating to parts that are compatible with the part, and
        the information relating to compatible parts includes an identifier for compatible parts and a similarity score indicating how similar each compatible part is to the part that is to be used to service the electronic asset, the similarity score representing a degree of compatibility between the part and the each compatible part; and
    providing the information relating to compatible parts to a user to facilitate service of the electronic asset; and wherein
    the plurality of data sources includes one or more of:
        telemetry data for parts used in the plurality of electronic assets;
        purchase orders for parts used in the plurality of electronic assets;
        invoices for parts used in the plurality of electronic assets;
        inventory data for parts used in the plurality of electronic assets;
        service records relating to the plurality of electronic assets;
        service records for parts used in the plurality of electronic assets; and
        a parts catalog for parts used in the plurality of electronic assets; and,
    training of the trained AI/ML parts similarity model comprises:
        extracting and selecting feature data from the plurality of data sources;
        executing an unsupervised AI/ML categorical model using the feature data to generate clusters of data corresponding to similar parts;
        executing a hash operation on the data corresponding to similar parts;
        executing a quantization operation on the hashed data;
        executing a mapping operation on the hashed data to map similar parts to correspondingly similar bins based on results of the quantization operation, wherein the mapping operation generates binned part data including the hashed data and corresponding bins; and
        using the binned part data as an input for training the trained AI/ML parts similarity model.

12. The non-transitory, computer-readable storage medium of claim 11, wherein
    the trained AI/ML parts similarity model further provides information relating to availability of one or more of the compatible parts.

13. The non-transitory, computer-readable storage medium of claim 11, wherein
    the trained AI/ML parts similarity model is further configured to identify alternative parts that are compatible with the part, wherein the alternative parts include parts not currently used in any of the plurality of electronic assets.

14. The non-transitory, computer-readable storage medium of claim 11, wherein the instructions are further configured for:
    using a trained AI/ML parts failure model to predict failure of a part used in an electronic asset; and
    providing part data for the part predicted to fail to an input of the trained AI/ML parts similarity model, wherein the trained AI/ML parts similarity model uses the part data for the part predicted to fail to provide information relating to parts that are compatible with the part predicted to fail.

* * * * *